(12) United States Patent  
McKiel, Jr.

(10) Patent No.: US 6,469,812 B2  
(45) Date of Patent: Oct. 22, 2002

(54) METHOD AND SYSTEM FOR IDENTIFYING UNDESIRED PRODUCTS OF NON-LINEAR OPTICAL MIXING

(75) Inventor: Frank A. McKiel, Jr., Plano, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/215,846

(22) Filed: Dec. 18, 1998

(65) Prior Publication Data

US 2002/0097473 A1 Jul. 25, 2002

(51) Int. Cl.[7] ............................................... H04B 10/08
(52) U.S. Cl. ..................... 359/110; 359/124; 359/125; 359/133; 359/173; 359/161; 359/127; 359/128; 359/181; 359/187
(58) Field of Search ................................ 359/110, 125, 359/133, 187, 173, 124, 128, 127, 181, 161

(56) References Cited

U.S. PATENT DOCUMENTS 5,546,190 A  *  8/1996  Hill et al. ................... 359/158
5,600,467 A  *  2/1997  Fee ............................ 359/124
5,717,510 A  *  2/1998  Ishikawa et al. ........... 359/161
5,956,165 A  *  9/1999  Fee et al. .................. 359/118
5,995,256 A  *  11/1999 Fee ............................ 359/125
6,104,514 A  *  8/2000  Fee et al. .................. 359/161
6,108,113 A  *  8/2000  Fee ............................ 359/124
6,128,111 A  *  10/2000 Roberts ...................... 359/110
6,215,565 B1 *  4/2001  Davis et al. ............... 359/110

* cited by examiner

*Primary Examiner*—Leslie Pascal  
*Assistant Examiner*—Hanh Phan

(57) ABSTRACT

An optical communications link including a low-level subcarrier to identify the optical carriers that are contributing to an unwanted mixing product. The subcarrier is added to each of the optical carriers, and then the presence or absence of the subcarrier is detected in the mixing product to identify which optical carriers are contributing towards the generation of the mixing product. The subcarrier will appear in the mixing product if its associated optical carrier is participating in the mixing product. The identified optical carriers that contribute to the mixing product can then diminished in amplitude or shifted in wavelength to reduce the impact of the undesirable signals. Several embodiments are described.

32 Claims, 4 Drawing Sheets

METHOD AND SYSTEM FOR IDENTIFYING UNDESIRED PRODUCTS OF NON-LINEAR OPTICAL MIXING

CROSS REFERENCE TO RELATED APPLICATIONS

Cross reference is made to the following co-pending patent applications, each being assigned to the same assignee as the present invention and the teachings included herein by reference:

| PATENT NUMBER | TITLE | ISSUE DATE |
| --- | --- | --- |
| 6,285,475 | Method and System for Detecting Optical Faults in a Network Fiber Link | 09/04/01 |
| 6,108,113 | All-Optical Network with Low-Level Subcarrier for Ancillary Data | 08/22/00 |

FIELD OF THE INVENTION

The present invention generally relates to an optical communication link, and more particularly, to a system and method for identifying which optical carriers being transmitted through an optical fiber are contributing to the generation of an undesired mixing product.

BACKGROUND OF THE INVENTION

Optical communication networks serve to transport information at high data rates between a number of physical sites, commonly referred to as nodes. Each of these nodes are interconnected with the various other nodes by information conduits, commonly referred to as links. These links are comprised of at least one, and usually several, optical fibers. Information is usually presented to the optical communication network in the form of time-domain electrical data signals, and may represent any combination of telephony, video, or computer data in a variety of formats. The electrical data signals are processed to intensity modulate the light output of respective laser diodes of an optical transmitter to generate modulated optical carriers suitable for traveling through optical fibers.

In order to increase the utilization of the optical communications fiber, wavelength division multiplexing (WDM) is typically employed to send multiple optical carriers along the optical fiber, each optical carrier having a different wavelength. Design engineers strive to maximize capacity of the communications network by transmitting as many optical carriers as possible over the optical fiber. While two-wavelength and four-wavelength optical systems are fairly common, the telecom industry is already planning for ways to crowd eight and sixteen optical carriers or channels within the so-called erbium band, roughly covering the range of wavelengths from 1530 to 1560 nanometers. The channels are usually evenly spaced to make best use of the band, and to allow use of comb-generating implements as references for tuning the carriers.

Unfortunately, evenly spaced carriers can interfere with one another and create mixing products if the optical power levels are high enough to cause the fiber medium to exhibit a non-linear refractive index. Mixing products are generated by several optical carriers of different wavelengths beating together and generating unwanted spurious wavelengths that can interfere with one or more of the desired optical carriers. The most common phenomenon that creates unwanted mixing products is referred to as four-wave mixing in which the difference of two wavelengths is summed with a third wavelength, yielding a fourth wavelength as a mixing product. In an exactly evenly spaced carrier plan, the resulting mixing product will coincide with one of the desired carrier wavelengths.

In commonly assigned U.S. Pat. No. 5,600,467, there is disclosed a technique for taking an inventory of observed unwanted byproducts, calculating the shifts in carrier wavelengths needed to move the unwanted wavelengths away from carrier wavelengths, and then fine tuning the carriers to accomplish the improved shifts. A pre-established look-up table of known interactions among the wavelengths is utilized to determine the shifting of one or several carrier wavelengths to reduce or move the unwanted mixing products.

In some cases, it is rather difficult to determine which optical carriers are contributing to the generation of a particular mixing product since several possible combinations of multiple optical carriers may produce the same spurious wavelength. Therefore, it is often not known which optical carriers must be perturbed in order to minimize or eliminate the interference. The optical carriers are typically revenue bearing data signals that can't be interrupted to identify the source of interference.

There is desired an improved optical communication link and technique that provides a more dynamic assessment of which transmit optical carrier wavelengths are actually involved in the production of a given observed spurious wavelength in the optical fiber.

SUMMARY OF THE INVENTION

The present invention achieves technical advantages as a system and method of modulating the optical carriers with a low-level subcarrier to identify which of the optical carriers are contributing to a particular unwanted mixing product. The present invention takes advantage of the fact that if a given optical carrier is participating in the generation of a mixing product, then the subcarrier modulating the optical carrier will also appear in the mixing product, thus identifying the associated optical carrier as a participant in the generation of the particular mixing product. The present invention selectively tags the optical carriers in a variety of ways, and then analyzes the mixing product for the presence of the tags. Various embodiments of the present invention are disclosed.

According to a first preferred embodiment of the present invention, a controller selectively switches a subcarrier signal onto each of the optical carriers, one at a time, and then detects the presence or absence of the subcarrier in a spurious wavelength under observation. Since it is known which optical carrier is being modulated with the subcarrier when the subcarrier is detected in the unwanted mixing product, the optical carriers contributing to the mixing product can be identified. The first embodiment comprises an optical communication link comprising an optical fiber having a transmit end and a receive end. An optical transmitter is coupled to the optical fiber transmit end and generates a plurality of optical carriers. A modulator is coupled to the optical transmitter for selectively modulating each of the optical carriers with a subcarrier. A sensor is coupled to the optical fiber link and senses the mixing product generated by some of the plurality of optical carriers. An analyzer is coupled to the sensor for analyzing the sensed mixing product. A controller is coupled to and controls both the modulator and analyzer, whereby the controller controls the analysis of the sensed mixing product as a function of which optical carrier is being modulated with the subcarrier. The analyzer senses the presence, or absence, of the subcarrier in the mixing product as a function of which optical carrier is being modulated with the subcarrier to identify the optical carriers contributing to the mixing product. The controller may also control the amplitude or frequency of the contributing optical carriers as a function of the presence of the subcarrier in the mixing product. Preferably, the analyzer comprises a spectrum analyzer, whereby the sensor may comprise an optical selective level meter and a detector.

According to a second embodiment of the present invention, a plurality of modulators are implemented, wherein each modulator modulates a different optical carrier with a separate subcarrier. Preferably, each of the subcarriers has a different characteristic frequency. A sensor is coupled to the optical fiber link and senses the mixing product generated by some of the plurality of optical carriers. An analyzer is coupled to the sensor and analyzes the mixing product to determine the presence of the subcarriers in the mixing product. The identification of the subcarriers identifies which corresponding optical carriers are contributing to the unwanted mixing product.

In a third embodiment, each of these separate subcarriers is modulated with data identifying the optical carrier being modulated by the respective subcarrier. The tagged subcarriers identify the associated optical carriers.

According to a fourth embodiment, a subcarrier generator is utilized to selectively modulate each of the optical carriers with a subcarrier according to a predetermined pattern. Thus, each optical carrier can be modulated with a common subcarrier. The optical communication link in this embodiment comprises an optical fiber link extending between a transmit end and a receive end. An optical transmitter is coupled to the optical fiber transmit end and generates a plurality of optical carriers. The subcarrier generator is coupled to the optical transmitter and modulates the optical carriers with a subcarrier according to a pre-determined pattern. A sensor is coupled to the optical fiber link and senses a mixing product generated by some of the plurality of optical carriers. An analyzer is coupled to the sensor and analyzes the mixing product, determining the presence of one or more subcarriers at a given time in the mixing product. Since the optical carriers are modulated with the subcarrier according to the known pre-determined pattern, the analyzer determines which of the optical carriers is being modulated with the subcarrier when the subcarrier is identified as being present in the mixing product. The subcarrier may further be modulated with data to identify which optical carrier is currently being modulated. This data can be ascertained by the analyzer to further help in ascertaining the identity of the particular optical carrier or carriers contributing towards the particular mixing product.

According to a method of the present invention, the method comprises detecting which of a plurality of optical carriers transmitted in an optical fiber are contributing toward the generation of a mixing product in the optical fiber. The method comprises the steps of modulating at least one, and preferably each in turn, of the optical carriers with a subcarrier, and then analyzing the mixing product to determine the presence of the subcarrier in the mixing product to determine which optical carriers are contributing toward the generation of the mixing product. In one embodiment, the analysis of the mixing product may be controlled as a function of which optical carrier is being modulated. In another embodiment, the method comprises the step of coordinating the modulation of each of the optical carriers with the subcarrier with the analysis of the mixing product, such as by using a common controller. According to a further embodiment, the method comprises the step of modulating the optical carriers with the subcarrier according to a pre-determined pattern. In another embodiment, each optical carrier is simultaneously modulated with a separate subcarrier, each subcarrier having a different frequency from the other. Each subcarrier may be further modulated with data identifying which optical carrier is being modulated by the respective subcarrier. According to the various methods of the present invention, the amplitude or frequency of one or several optical carriers may be adjusted as a function of the analyzed mixing product to reduce or eliminate the presence of the mixing product.

DESCRIPTION OF THE PREFERRED EMBODIMENT

Figure 1:
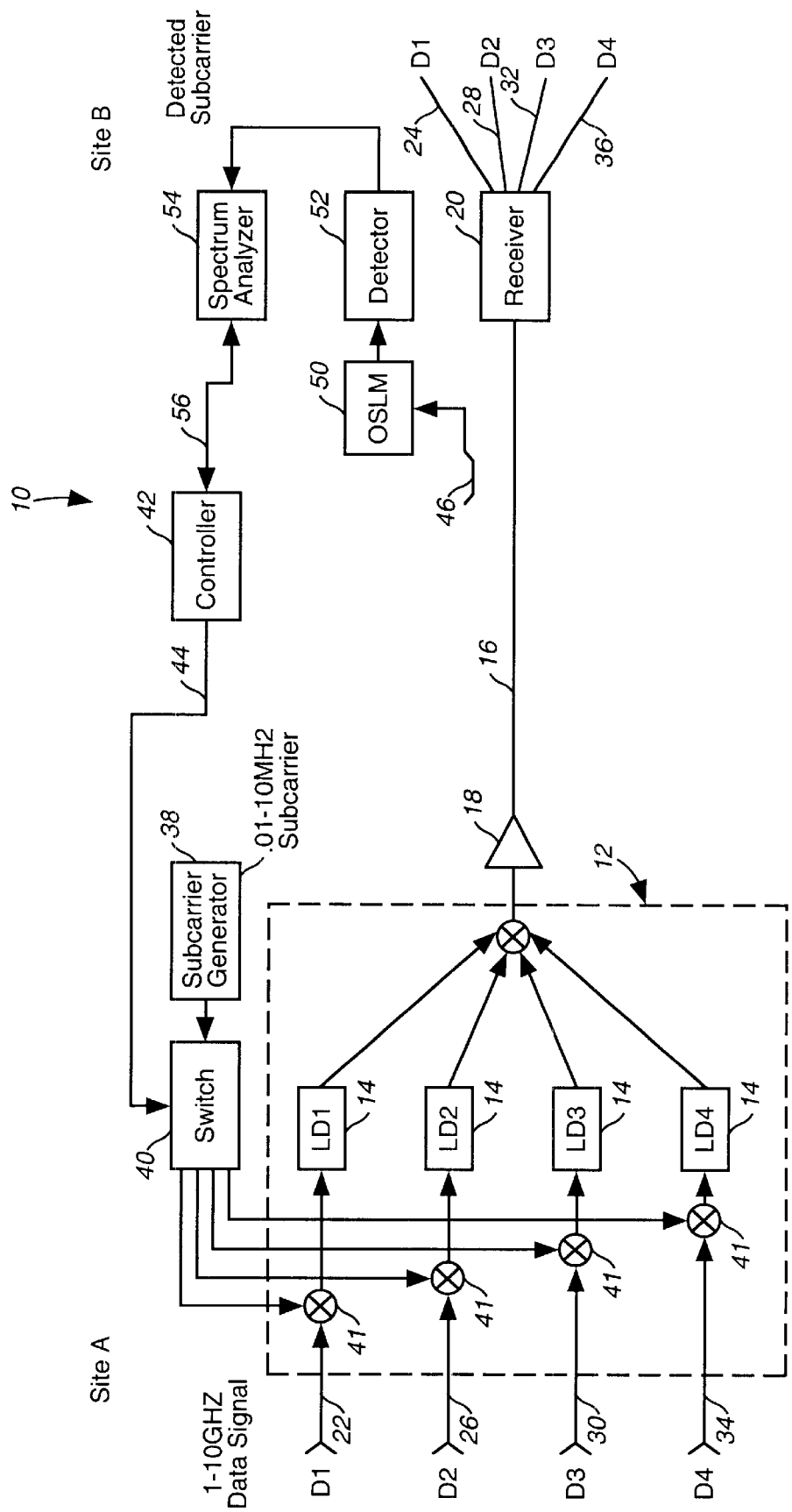
FIG. 1 is a block diagram of a first embodiment of the invention whereby a controller selectively controls the selective addition of a subcarrier to each optical carrier, the controller controlling a spectrum analyzer coupled to the optical link for determining the presence of the subcarrier in a mixing product as a function of which optical carrier is being modulated with the subcarrier.

Referring now to FIG. 1, there is generally shown at 10 an optical link according to a first preferred embodiment of the present invention. Optical link 10 is seen to include an optical transmitter 12 at site A receiving four high data rate electrical data signals D1, D2, D3 and D4. The electrical data signals D1, D2, D3 and D4 can each be, for example, SONET-compliant STS-48 or STS-192 synchronous data signals bearing data at about 2.5 Gbps or 9.9 Gbps, respectively. Multiple lower data rate signals, such as DS3 signals, are usually time division multiplexed to form one high data rate input data signal.

Optical transmitter 12 is seen to include separate semiconductor laser diodes 14 identified as LD1, LD2, LD3 and LD4. Each semiconductor laser diode 14 is coupled to and intensity modulated by one of the corresponding input data signals D1, D2, D3 and D4. Light emitted by each semiconductor laser diode 14 is intensity modulated by the respective electrical data signal coupled to the respective laser diode 14 to deliver a modulated optical output signal or carrier over a common optical fiber 16. Each of the semiconductor laser diodes 14 emits a light carrier at a different frequency from one another, and thus, the optical transmitter 12 provides wavelength division multiplexing (WDM) such that all four modulated optical carriers travel over the single optical fiber 16. For purposes of illustration and clarity to teach the present invention, four electronic data signals and four corresponding optical carriers are illustrated and discussed herein, with it being understood more or fewer data signals and optical carriers could be implemented as desired, and limitation to the number of sources and optical carriers is not to be inferred.

One or more optical amplifiers 18 are provided in series with the optical fiber 16. Amplifier 18 amplifies the optical carriers along the fiber 16 to provide the optical carriers at a sufficient signal strength for detection at an optical receiver 20. Dispersion compensation of the optical carriers may also be provided along the length of optical fiber 16 if desired, such as disclosed in commonly assigned U.S. patent application Ser. No. 09/215,844, filed Dec. 18, 1999, entitled "Optical Link with Reduced Four-Wave Mixing", the teachings of which are incorporated herein by reference.

An optical receiver 20 is located at site B, and includes a separate photodiode tuned via an optical filter to the frequency of the respective optical carrier generated by the respective semiconductor laser diode 14 at transmitter 12. The photodiodes at receiver 20 transduce the optical carriers or signals to render faithful electrical reproductions of the respective data signals D1, D2, D3 and D4. Electrical data provided as D1 to the laser diode 14 identified as LD1 is faithfully transmitted over the optical fiber 16 and reproduced at the corresponding output line D1 at site B. Likewise, electrical data provided as D2, D3 and D4 to transmitter 12 is likewise transmitted over the common optical fiber 16 and faithfully reproduced at the respective output at site B. Thus, input line 22 is optically coupled to output line 24, input line 26 is optically coupled to output line 28, input line 30 is optically coupled to output line 32, and input line 34 is optically coupled to output line 36.

According to the present invention, optical link 10 is further seen to include a subcarrier generator 38 functioning as a modulator generating a low frequency electrical subcarrier signal which is provided to a switch 40. Switch 40 is controlled by a controller 42 via line 44 and provides the input subcarrier signal to the output selected by controller 42. The low frequency subcarrier is controllably provided by switch 40 to each of the respective signal combiners 41. The input high data rate signals D1, D2, D3 and D4 are all provided to the first input of the respective signal combiners 41. The low frequency subcarrier is selectively provided by subcarrier switch 40 to the second input of each signal combiner 41. The linear summation of the input data signals and the subcarrier appears at the output of the respective combiner 41. This composite signal is then coupled to the respective laser diode 14 to intensity modulate the respective laser diode 14. The optical carrier generated by the respective laser diode 14 is thus intensity modulated by both the high data rate signal input to the respective laser diode 14 input, as well as the low frequency subcarrier when it is selectively provided to the respective combiner 41.

The monitoring subcarrier signal has a substantially lower frequency and amplitude than the main data signals D1, D2, D3 and D4. In the preferred embodiment, the frequency of the superimposed subcarrier signal is several orders of magnitude less than that of the data signals. For example, if data signal D1 is in the order of 1 to 10 GHz, i.e., a SONET-compliant STS-48 digital signal (approximately 2.5 Ghz) or an STS-192 signal (approximately 9.9 GHz), the subcarrier signal may range from 1 KHz to 10 MHz. The subcarrier signal has a fraction of the amplitude of a main data signal, such as one tenth of the amplitude thereof. Other ranges of amplitude and frequencies for both the subcarrier modulation signal and the main data signals can be selected as desired. The light output of each laser diode 14 is thus modulated by the composite signal provided by the respective combiner 41 and propagates through the fiber 16, amplifier 18 to the receiver 20.

Referring now to the receiving end of link 10 at site B, there is seen an optical signal tap 46 coupled to the receive end of optical fiber 16 tapping a small portion of the optical carriers being transmitted over fiber 16. The optical signal tapped by optical coupler 46 is provided to an optical selective level meter (OSLM) 50 to render an electrical signal. The filtered signal from the OSLM 50 is then passed to a modulation detector 52. The resulting recovered electrical signal is then submitted to a tone detector or spectrum analyzer 54. Spectrum analyzer 54 is coupled to and selectively controlled by microprocessor-based controller 42 via control line 56. Spectrum analyzer 54 is selectively and controllably tuned by controller 42 to analyze a particular spurious wavelength, such as an unwanted mixing product, generated by some of optical carriers being transmitted over fiber 16. Spectrum analyzer 54 analyzes the spurious wavelength to detect the presence or absence of the subcarrier. Since the controller 42 knows which optical carrier is being modulated with the subcarrier, this allows the controller 42 via spectrum analyzer 54 to ascertain and identify which optical carriers are contributing to an unwanted mixing product. The subcarrier applied to the optical carrier participating in the generation of the mixing product will appear in the mixing product.

For instance, if the optical carriers provided by laser diode LD2 and laser diode LD3 are contributing toward the generation of an unwanted mixing product observed by spectrum analyzer 54, the subcarrier modulating laser diode LD2 and laser diode LD3, will be present in the mixing product and be detected by spectrum analyzer 54. Thus, controller 42 can identify which of the optical carriers generated by laser diodes 14 are contributing towards the generation of an unwanted mixing product by detecting the associated subcarrier. By knowing which optical carriers are contributing toward the generation of an unwanted mixing product, the contributing optical carriers can then be diminished in amplitude or shifted in wavelength to reduce the impact of the undesirable signals. Diminishing the amplitude of a contributing carrier can have a disproportionate effect on a spurious signal, sometime making it effectively disappear. Shifting the wavelength of a contributing optical carrier can move the mixing product into an unoccupied portion of the transmit spectrum, for example, into the guard band between two optical carriers.

According to the first embodiment of FIG. 1, the controller 42 directs switch 40 to provide the subcarrier signal via combiners 41 onto any of the optical carriers, whereby the same controller 42 detects the presence or absence of the subcarrier in a spurious wavelength under observation via spectrum analyzer 54. Because both the transmit end and receive end of the optical link 10 are connected to the common controller 42, the search for contributing optical carriers is direct.

Because the frequency of the subcarrier generated by subcarrier generator 38 is at a sufficiently low frequency and amplitude as compared to the higher frequency data signals, the low level subcarrier frequency will have no significant effect on the optical carriers or the sensing of optical carriers by the photodiodes at receiver 20. Thus, the bit error rate of optical link 10 is not appreciably effected by the superimposing of the subcarrier onto any of the optical carriers.

Figure 2:
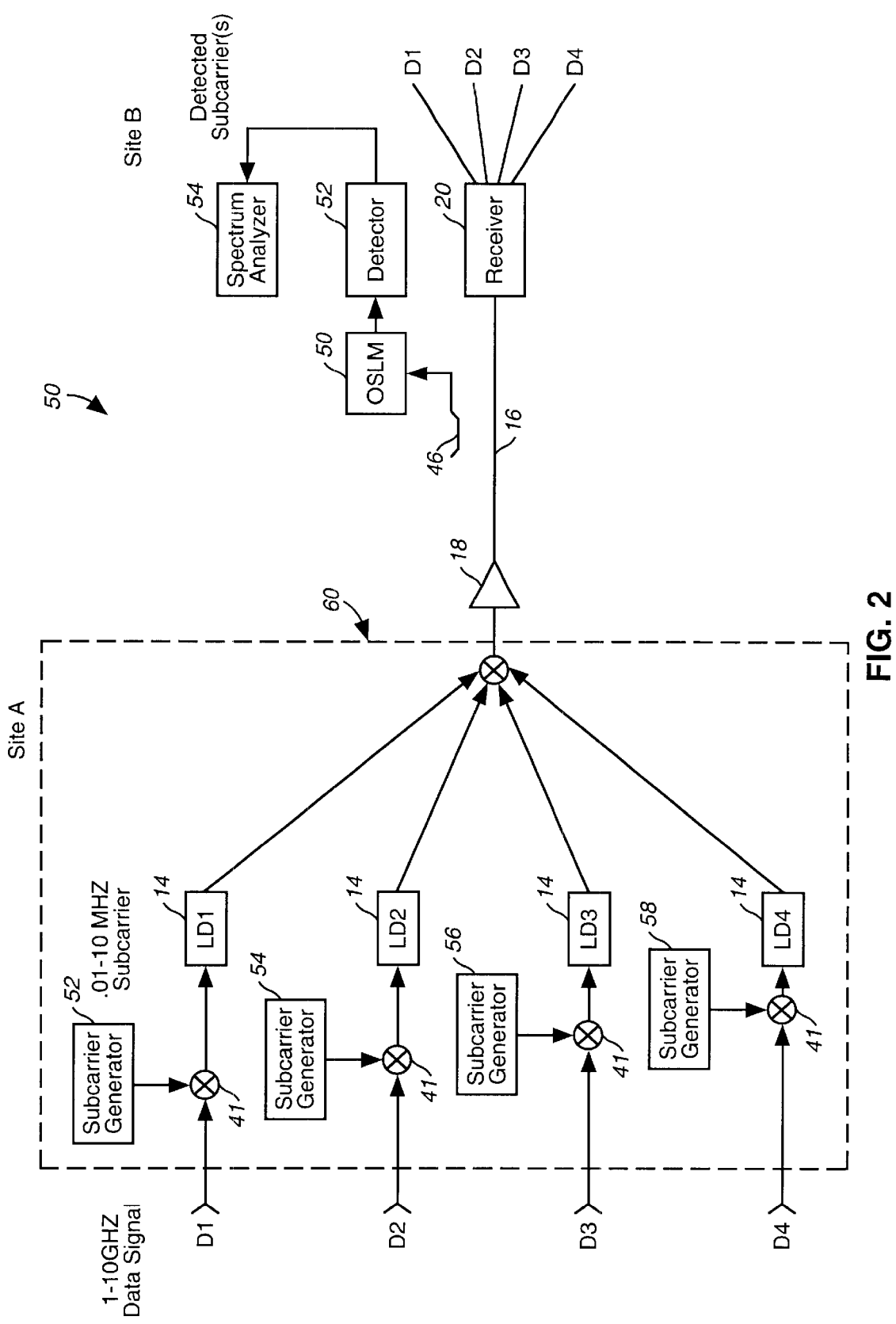
FIG. 2 is a block diagram of the second preferred embodiment illustrating a separate subcarrier being added to each of the optical carriers, each subcarrier having a different frequency, whereby a spectrum analyzer analyzes the mixing product to determine the presence of the various subcarriers to determine which optical carriers are contributing toward the mixing product.

Referring now to FIG. 2, there is shown a second embodiment of the present invention generally shown at 50. Optical link 50 is similar to optical link 10, wherein like numerals refer to like elements. In this embodiment, a separate frequency subcarrier generator functioning as a separate modulator provides a separate subcarrier to each of the laser diodes 14 via a respective signal combiner 41, the separate frequency subcarrier generators being shown at 52, 54, 56 and 58. The laser diodes 14, the combiners 41 and the associated subcarrier generators comprise optical transmitter 60.

In this embodiment, a separate subcarrier having a different frequency from the next is utilized to identify or tag each of the respective associated optical carriers, i.e. each carrier is modulated with a unique subcarrier signal. Each subcarrier generated by the respective subcarrier generator has a low frequency and low amplitude as compared to the associated high data rate signals D1, D2, D3 and D4 provided to the combiners 41. The receive end of link 50 at site B is the same as that shown in FIG. 1. In this embodiment, spectrum analyzer 54 is selectively tuned to analyze one or more of the detected spurious wavelengths comprising a mixing product to identify the signatures of the contributing optical carriers. For instance, if spectrum analyzer 54 detects the presence of the subcarriers generated by subcarrier generator 52 and 56, it is determined that the optical carriers generated by laser diode LDI and laser diode LD3 are the contributing optical carriers to the unwanted mixing product under observation.

Similarly, if the spectrum analyzer detects the presence of the subcarriers generated by subcarrier generator 56 and 58, it is then determined that the optical carriers generated by laser diode LD3 and laser diode LD4 are the contributing optical carriers to the unwanted mixing product.

Knowing which optical carriers are contributing toward the mixing signal is then utilized to reduce the amplitude of the one or more of the contributing optical carriers to significantly reduce the mixing product. Alternatively, the wavelength of one or more of the optical carriers contributing to the undesired mixing product can be shifted to move the mixing product into an unoccupied portion of the transmit spectrum, for example, into the guard band between two optical carriers. The present embodiment provides separate discrete subcarrier generators for each of the laser diodes LD1, LD2, LD3 and LD4 to tag or identify each of the optical carriers, and does not require a controller. The spectrum analyzer 54 identifies which of the optical carriers are contributing to the unwanted mixing product by knowing which subcarrier is associated with which optical carrier.

Figure 3:
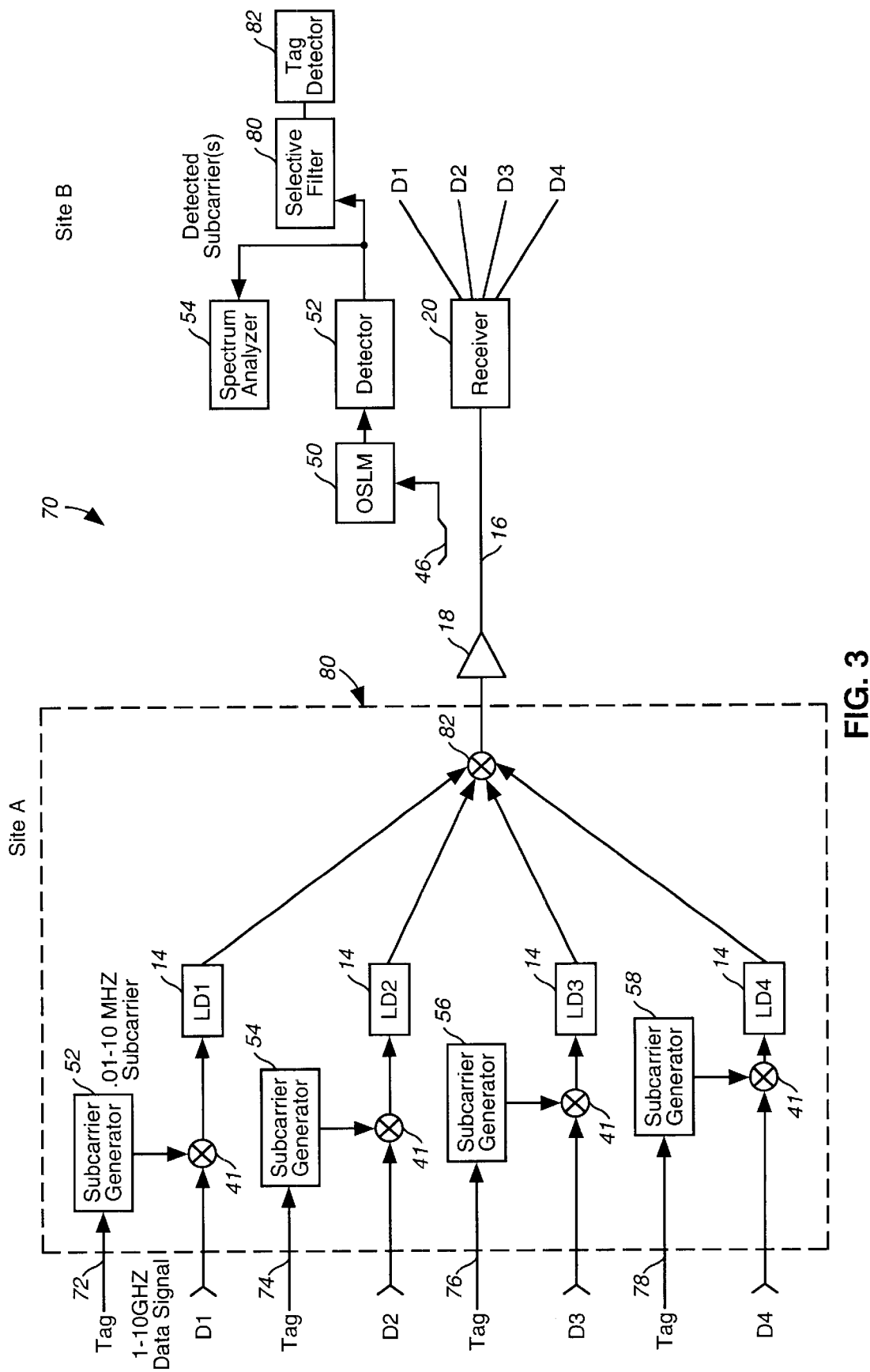
FIG. 3 is a block diagram of a third embodiment of the present invention similar to the embodiment of FIG. 2, whereby each of the subcarriers is further modulated with data identifying the optical carrier being modulated by the respective subcarrier.

Referring now to FIG. 3, there is shown a third embodiment of the present invention comprising an optical link 70. Optical link 70 is similar to optical link 50 in FIG. 2, wherein like numerals refer to like elements. In this embodiment, each laser diode LD1, LD2, LD3 and LD4 is modulated by a separate subcarrier having a different frequency. Each subcarrier modulating the respective optical carrier is itself further modulated with a data tag comprising a data stream identifying the associated optical carrier. The respective data tags are input on lines 72, 74, 76 and 78. The recovered subcarrier is then analyzed by analyzer 54. In addition, a selective filter 80 taps the output of detector 52 and filters the selected subcarrier to render a tag which is analyzed by a tag detector 82. Detector 82 identifies the optical carrier contributing to the mixing product by analyzing the recovered tag. Both the data tag and subcarrier frequency identify the respective optical carrier. All subcarriers generated by generators 52, 54, 56 and 58 modulate the respective laser diodes 14 to identify the respective optical carriers that are wavelength division multiplexed across the fiber 16 via combiner 22. Together, the subcarrier generators and laser diodes comprise transmitter 80.

Figure 4:
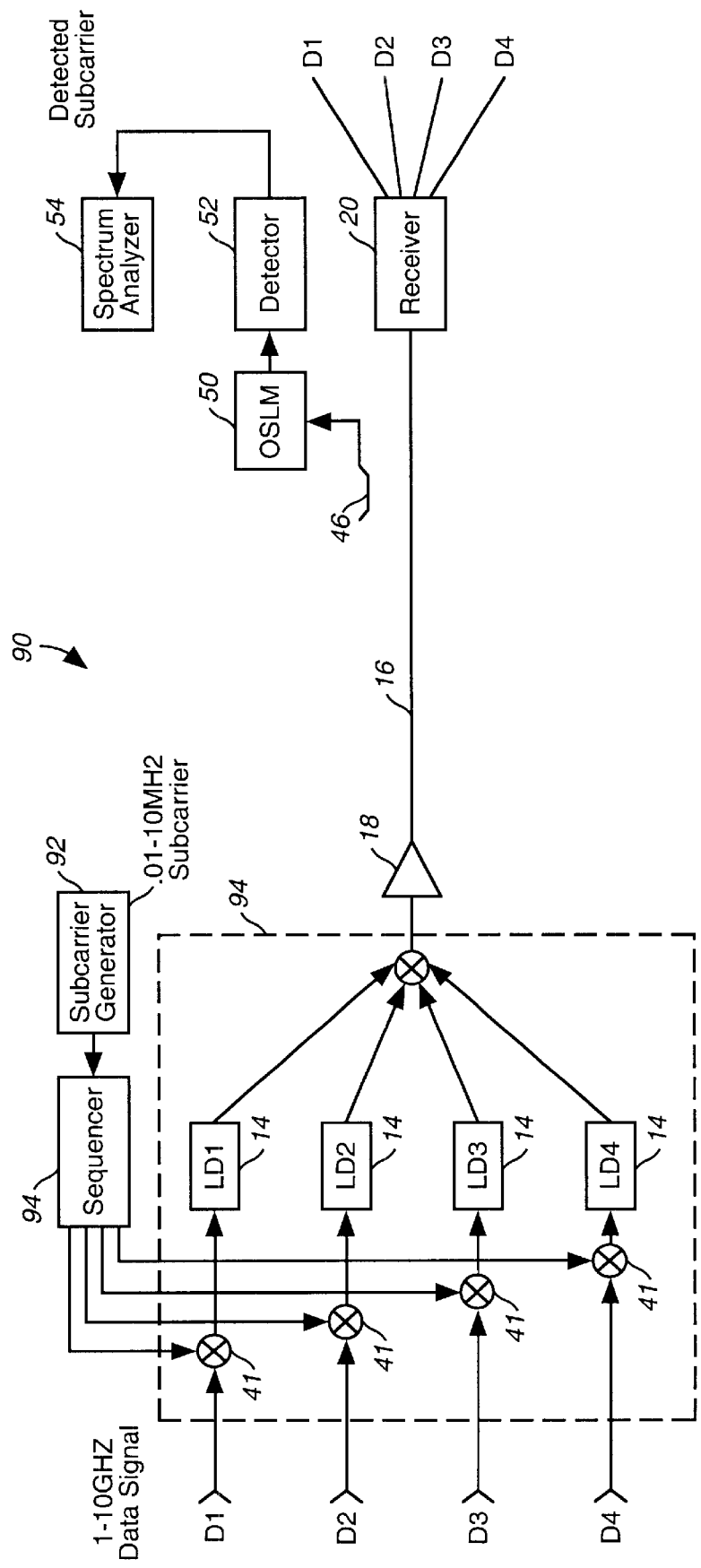
FIG. 4 is a block diagram of a fourth embodiment of the present invention whereby a subcarrier generator adds a subcarrier to the various optical carriers according to a predetermined pattern, such as sequentially, whereby the spectrum analyzer detects the presence of the subcarrier in the sensed mixing product in view of the predetermined pattern.

Referring now to FIG. 4, there is shown a fourth embodiment of the present invention identified at 90. Optical link 90 is seen to be similar to the optical link 10 of FIG. 1, wherein. like numerals refer to like elements. In this embodiment, a subcarrier generator 92 functioning as a modulator provides a subcarrier at a predetermined frequency to a sequencer 94. Sequencer 94 provides the subcarrier to each of the laser diodes 14 via respective combiners 41 according to a predetermined pattern. As will be appreciated by one of ordinary skill in the art, a predetermined pattern or sequence may be designed to impart a characteristic signature to each carrier and any resultant mixing products. By using an appropriately chosen pattern, an analyzer can synchronize to the pattern and identify contributing carriers without any separate coupling to the subcarrier generation. For example, a technique similar to code-division multiple access (CDMA) may be employed to assure orthogonality among the subcarrier signals on each optical carrier.

For instance, the sequencer 94 can supply the subcarrier in a sequence such as modulate all laser diodes, modulate first, modulate second, modulate third and modulate fourth laser diode, wait. The duration that the subcarrier is provided by sequencer 94 to each of the laser diodes 14 via combiners 41 is sufficient to allow the receive end of the link including the spectrum analyzer 54 to synchronize with the known predetermined sequencing. In this manner, the spectrum analyzer 54 will know that after all four laser diodes are simultaneously modulated, the first optical carrier to be modulated by the subcarrier will be that generated by laser diode LD1. A predetermined time period thereafter, such as 10 milliseconds, it will be known that the second optical carrier generated by LD2 will be modulated and so forth. According to the fourth embodiment of the present invention, only a single subcarrier generator is required that generates a subcarrier at a single frequency. This subcarrier, at the known frequency, can then be ascertained via the coupler 46, OSLM 50, detector 52 and spectrum analyzer 54 to determine the presence of the subcarrier in the mixing product under observation to determine the optical carriers contributing to a mixing product. Control between the sequencer 94 and spectrum analyzer 54 is not required. As with the other embodiment of the present invention, upon ascertaining which optical carriers are contributing toward the generation of an undesired mixing product such as a spurious signal, one or several contributing optical carriers can be reduced in amplitude or shifted in wavelength to reduce the impact of the undesirable signals.

Regardless of which of the four embodiments are used, the present invention comprises the method of selectively adding a subcarrier signal to one or more of the optical carriers, and then analyzing an undesirable mixing product to ascertain the subcarrier and identify which of the optical carriers are contributing toward the undesirable signal. The several embodiments previously discussed all operate based on this method. Namely, the subcarrier applied to and modulating an optical carrier will be present in a mixing product if that optical carrier is contributing toward the generation of the mixing product. The presence, or absence of, the subcarrier from the mixing product is used to ascertain whether or not the optical carrier associated with the subcarrier is contributing toward the undesirable mixing product. Again, the subcarrier modulating the optical carriers is at a sufficiently low frequency and amplitude so as not to degrade the quality of the data link or significantly increase the bit error rate between the optical transmitter and optical receiver. The subcarrier or subcarriers are advantageously used to identify which optical carriers are contributing towards the generation of a mixing product. Thereafter, the contributing optical carriers can be reduced in amplitude or shifted in wavelength to reduce the impact of the undesirable spurious signals. Reducing the amplitude can sometimes make the mixing product effectively disappear. Shifting the wavelength of an optical carrier moves the mixing product into an unoccupied portion of the transmit spectrum, for example, into he guard band between two carriers.

Though the invention has been described with respect to a specific preferred embodiment, any variations and modifications will become apparent to those skilled in the art upon reading he present application. It is therefore the intention that the appended claims be interpreted as broadly as possible in view of the prior art to include all such variations and modifications.

We claim:

1. An optical communication link, comprising:
   an optical fiber having a transmit end and a receive end;
   an optical transmitter coupled to said transmit end for generating a plurality of optical carriers;
   modulating means coupled to said optical transmitter for selectively modulating each of said optical carriers with a subcarrier;
   sensing means coupled to said optical fiber for sensing a mixing product generated by said plurality of optical carriers;
   analyzing means coupled to said sensing means for analyzing said sensed mixing product; and
   control means coupled to and controlling said modulating means and said analyzing means.

2. The optical communication link specified in claim 1, wherein said analyzing means detects the presence of said subcarrier in said mixing product.

3. The optical communication link specified in claim 2, wherein said analyzing means detects the presence of said subcarrier in said mixing product as a function of which one of said optical carriers is being modulated with said subcarrier.

4. The optical communication link specified in claim 3, wherein said control means controls an amplitude of at least one said optical carriers as a function of the detected presence of said subcarrier in said mixing product.

5. The optical communication link specified in claim 1, wherein said analyzing means comprises a spectrum analyzer.

6. The optical communication link specified in claim 1, wherein said sensing means comprises an optical selective level meter (OSLM).

7. The optical communication link specified in claim 6, wherein said sensing means further comprises a discriminator coupled to said OSLM.

8. A device for controlling a modulator coupled to a transmit end of an optical fiber link and an analyzer coupled to a receive end of the optical fiber link of an optical communications system, comprising:

a memory configured to store instructions; and
a processor configured to execute the instructions in the memory to:
   direct the modulator to selectively apply a subcarrier to modulate each of a plurality of optical carriers transmitted from an optical transmitter coupled to the transmit end of the optical fiber link,
   instruct the analyzer to analyze a mixing product generated by the plurality of optical carriers, and
   identify which of the plurality of optical carriers is contributing to the mixing product based on the analysis of the mixing product.

9. The device of claim 8, the processor further configured to:
   instruct the analyzer to analyze the mixing product to detect a presence or absence of the subcarrier, and
   identify which of the plurality of optical carriers is contributing to the mixing product based on the presence or absence of the subcarrier.

10. The device of claim 9, the processor further configured to:
    control an amplitude of at least one of the plurality of optical carriers as a function of the detected presence of the subcarrier in the mixing product.

11. The device of claim 8, wherein the mixing product is generated by a number of the plurality of optical carriers beating together to produce one or more spurious wavelengths.

12. The device of claim 8, wherein the analyzer comprises a spectrum analyzer.

13. The device of claim 8, the processor further configured to:
    identify which of the plurality of optical carriers is contributing to the mixing product as a function of which one of the optical carriers is being modulated with the subcarrier.

14. A device for controlling a modulator coupled to a transmit end of an optical fiber link and an analyzer coupled to a receive end of the optical fiber link in an optical communications system, comprising:
    at least one interface configured to couple to the modulator and analyzer; and
    logic circuitry configured to:
       direct the modulator, via the at least one interface, to selectively apply a subcarrier to modulate each of a plurality of optical carriers transmitted from an optical transmitter coupled the transmit end of the optical fiber link,
       instruct the analyzer, via the at least one interface, to analyze a mixing product generated by the plurality of optical carriers to detect a presence or absence of the subcarrier, and
       identify which of the plurality of optical carriers is contributing to the mixing product based on the presence or absence of the subcarrier.

15. The device of claim 14, the logic circuitry further configured to:
    control an amplitude of at least one of the plurality of optical carriers as a function of the detected presence of the subcarrier in the mixing product.

16. The device of claim 14, wherein the analyzer comprises a spectrum analyzer.

17. The device of claim 14, the logic circuitry further configured to:
    identify which of the plurality of optical carriers is contributing to the mixing product, as a function of which one of the optical carriers is being modulated with the subcarrier.

18. A computer-readable medium containing instructions for controlling at least one processor to perform a method for controlling a modulator and an analyzer in an optical communications system, the method comprising:
- directing the modulator to selectively apply a subcarrier to modulate each of a plurality of optical carriers transmitted from an optical transmitter coupled to an optical link;
- instructing the analyzer to analyze a spurious wavelength on the optical link comprising a mixing product generated by the plurality of optical carriers to detect a presence or absence of the subcarrier; and
- identifying which of the plurality of optical carriers is contributing to the mixing product based on the presence or absence of the subcarrier.

19. An optical system coupled to an optical fiber link, comprising:
- a transmitter coupled to a transmit end of the optical fiber link, the transmitter configured to transmit a plurality of optical carriers;
- a subcarrier generator configured to generate at least one subcarrier signal; and
- a controller configured to:
  - selectively switch the at least one subcarrier signal to modulate each of the plurality of optical carriers,
  - receive measurements related to a mixing product generated by the plurality of optical carriers from an analyzer coupled to a receive end of the optical fiber link, and
  - identify which of the plurality of optical carriers is contributing to the mixing product based on the received measurements.

20. The system of claim 19, wherein the mixing product is generated by a number of the plurality of optical carriers beating together to produce one or more spurious wavelengths.

21. The system of claim 19, wherein the received measurements indicate a presence or absence of the subcarrier in the mixing product.

22. The system of claim 21, the controller further configured to:
- identify which of the plurality of optical carriers is contributing to the mixing product based on the presence or absence of the subcarrier in the mixing product.

23. The device of claim 21, the controller further configured to:
- control an amplitude of at least one of the plurality of optical carriers as a function of the detected presence of the subcarrier in the mixing product.

24. The device of claim 19, the controller further configured to:
- identify which of the plurality of optical carriers is contributing to the mixing product as a function of which one of the optical carriers is being modulated with the subcarrier.

25. An optical system coupled to an optical fiber link, comprising:
- a controller configured to:
  - selectively apply a subcarrier signal to modulate a plurality of optical carriers transmitted by a transmitter from a transmit end of the optical fiber link;
- an analyzer coupled to a receive end of the optical fiber link and configured to:
  - analyze a mixing product generated by the plurality of optical carriers to detect the presence or absence of the subcarrier signal in the mixing product;
- the controller further configured to:
  - receive measurements related to the mixing product from the analyzer, and
  - identify which of the plurality of optical carriers is contributing to the mixing product based on the received measurements.

26. The system of claim 25, wherein the mixing product is generated by a number of the plurality of optical carriers beating together to produce one or more spurious wavelengths.

27. The system of claim 25, wherein the received measurements indicate a presence or absence of the subcarrier in the mixing product.

28. The system of claim 27, the controller further configured to:
- identify which of the plurality of optical carriers is contributing to the mixing product based on the presence or absence of the subcarrier in the mixing product.

29. The device of claim 27, the controller further configured to:
- control an amplitude of at least one of the plurality of optical carriers as a function of the detected presence of the subcarrier in the mixing product.

30. The device of claim 25, wherein the analyzer comprises a spectrum analyzer.

31. The device of claim 25, the controller further configured to:
- identify which of the plurality of optical carriers is contributing to the mixing product as a function of which one of the optical carriers is being modulated with the subcarrier.

32. An optical communications system, comprising:
- an optical fiber having a transmit end and a receive end;
- an optical transmitter coupled to the optical fiber transmit end and configured to generate a plurality of optical carriers;
- a modulator coupled to the optical transmitter and configured to modulate each of the optical carriers with a subcarrier;
- a sensing unit coupled to the optical fiber link and configured to sense a mixing product generated by the plurality of optical carriers;
- an analyzer coupled to the sensing unit and configured to analyze the mixing product; and
- a controller coupled to the modulator and the analyzer and configured to control the modulator and analyzer.

* * * * *